Dec. 1, 1970  P. HOAGLAND, JR  3,544,943

OVERCURRENT RESPONSIVE DEVICE

Filed June 17, 1968

INVENTOR.
Porter Hoagland, Jr.
BY
Harry B. Cook,
ATTORNEY

United States Patent Office 3,544,943
Patented Dec. 1, 1970

3,544,943
OVERCURRENT RESPONSIVE DEVICE
Porter Hoagland, Jr., Rumson, N.J., assignor to Hoagland Instrument Company, Red Bank, N.J., a corporation of New Jersey
Filed June 17, 1968, Ser. No. 737,428
Int. Cl. H01h 37/46, 61/06, 71/18
U.S. Cl. 337—139                                                 7 Claims

ABSTRACT OF THE DISCLOSURE

An electrical device which exhibits a predetermined physical distortion when exposed to current in excess of that to which it is normally subjected. The device comprises a thermally responsive assembly in the form of a cantilevered element which may be connected in series with a circuit to be monitored, an overcurrent causing heating and flexure of the element, movement of the element being transmitted to a switching device. The cantilevered element comprises a pair of elongated conductors connected in parallel, and the response time of the device may be matched to that of an appliance to be protected by varying the materials and/or configuration of the members of the cantilevered element. The device may also be self-compensating for variations in ambient temperature.

BACKGROUND OF THE INVENTION

Field of the invention

The present invention relates to the protection of electrical appliances and the like. More particularly, the present invention is directed to overcurrent responsive devices which may be employed to protect an electrical load, at least a portion of the load current flowing through the device. Accordingly, the general objects of the present invention are to provide novel and improved methods and apparatus of such character.

Description of the prior art

While not limited thereto in its utility, the present invention is particularly well suited for use in the protection of motors against damage due to overload. In the past, it has been standard practice to design motors so as to enable them to withstand current considerably in excess of that for which they were rated. This "over design" was, of course, expensive and in order to reduce costs present motors employ less copper and iron. Restated, partly as a result of the availability of higher temperature insulating materials, motor design now concentrates upon providing the smallest and lightest motor possible which will adequately meet the needs of the particular application. As motor design practice has changed, there has simultaneously evolved a need for improved overload protection devices. The overload devices employed with prior art motors did not provide for precise enough calibration and control to adequately protect modern, light-weight motors.

Continuing, for purposes of example only, a discussion of the art of protection of rotating electrical machinery, obviously the protective device which is suitable for use with a heavy duty motor of a given horsepower will not safely guard against damage of another motor with the same horsepower but designed for an application which does not require overload operation. In short, the only solution to the design of motor overload relays is to provide a protective device which may be matched to the curve of the machine which is to be protected.

In the past, a considerable number of electromechanical switching devices have been proposed and, in some cases, fabricated. The form of device to which the present invention is directed may be generally referred to as a thermal switch of the cantilevered type. In the prior art, such cantilevered switches have been employed in time delay relays, overvoltage and undervoltage relays and numerous other devices having utility in the protection of rotating machinery and elsewhere. However, these prior cantilevered, thermal switching devices have been characterized by certain inherent deficiencies. For example, the design of these prior art devices has been contrary to the necessary flexibility and has thus precluded the variation of the inverse time vs. overload current reaction curves of the devices without resorting to complete redesign. Also, prior art thermal switches of the cantilevered type have typically employed a heater element through which the overload current was caused to pass and, partly as a result of the use of conventional thermally activated elements, prior art switching devices of this type have had comparatively slow response times. It should be noted that, in order to provide "quick trip" relays, the prior art has typically employed thermal elements which heat rapidly under fault or short circuit conditions and, as is well known, such elements are subject to failure under extreme overload conditions and, in any event, will normally fail in time.

SUMMARY OF THE INVENTION

The present invention overcomes the above-discussed and numerous other disadvantages of the prior art by providing a novel thermal switch of the cantilevered type wherein there are two conductors at least one of which will heat and expand in relation to the other as the result of carrying excess currents. A thermally responsive assembly includes the cantilevered element of the present invention which is comprised of two metallic members that are constructed and connected in circuit in such a way as to force the current to to be monitored either entirely through one member or disproportionately in both members where the members are selected so as to have different resistances. In the first case, all of the current passes through one member which preferably is bifurcated with the arms connected in series circuit so that only the bifurcated strip is heated by the current. In the latter case, these two members, both of which are good conductors, will be electrically connected in parallel and the elements will be in series with a circuit which is to be monitored. Upon the occurrence of an over-load in the monitored circuit, maximum current will pass through the member having the lower resistance causing rapid heating and thus expansion of this member with the resulting flexure of the cantilevered element. Movement of the cantilevered element will be transmitted to a switching mechanism which will perform the actual circuit breaking or closing function. The two members which comprise the cantilevered element may be sized and/or fabricated from materials having different resistivities so as to enable the device to have the desired inverse time vs. current response and a selected cantilevered element may readily be installed in operative relationship with the switching mechanism and other components of the device.

Accordingly, it may be seen that an object of the present invention is to provide a thermally responsive switching device which can be caused to have various inverse time delay trip times without requiring significant differences in the elements comprising the device.

It is also an object of the present invention to provide a thermal switch which exhibits a faster response to overcurrents than prior art devices of like character.

It is another object of the present invention to eliminate the need for bimetallic elements in overload relays and circuit breakers.

It is yet another object of the present invention to provide an overload relay which reacts quickly to excess currents and yet will withstand short circuit currents.

It is still another object of the present invention to provide a thermally responsive, overload relay which may be self-compensating for variations in ambient temperature.

It is also an object of the present invention to provide a thermally responsive, overload relay which does not employ an independent heater element and does not rely for operation upon the exchange of thermal energy between components of the device.

A BRIEF DESCRIPTION OF THE DRAWING

The present invention may be better understood by referring to the accompanying drawing in which.

DESCRIPTION OF THE PREFERRED EMBODIMENT

Figure 1:
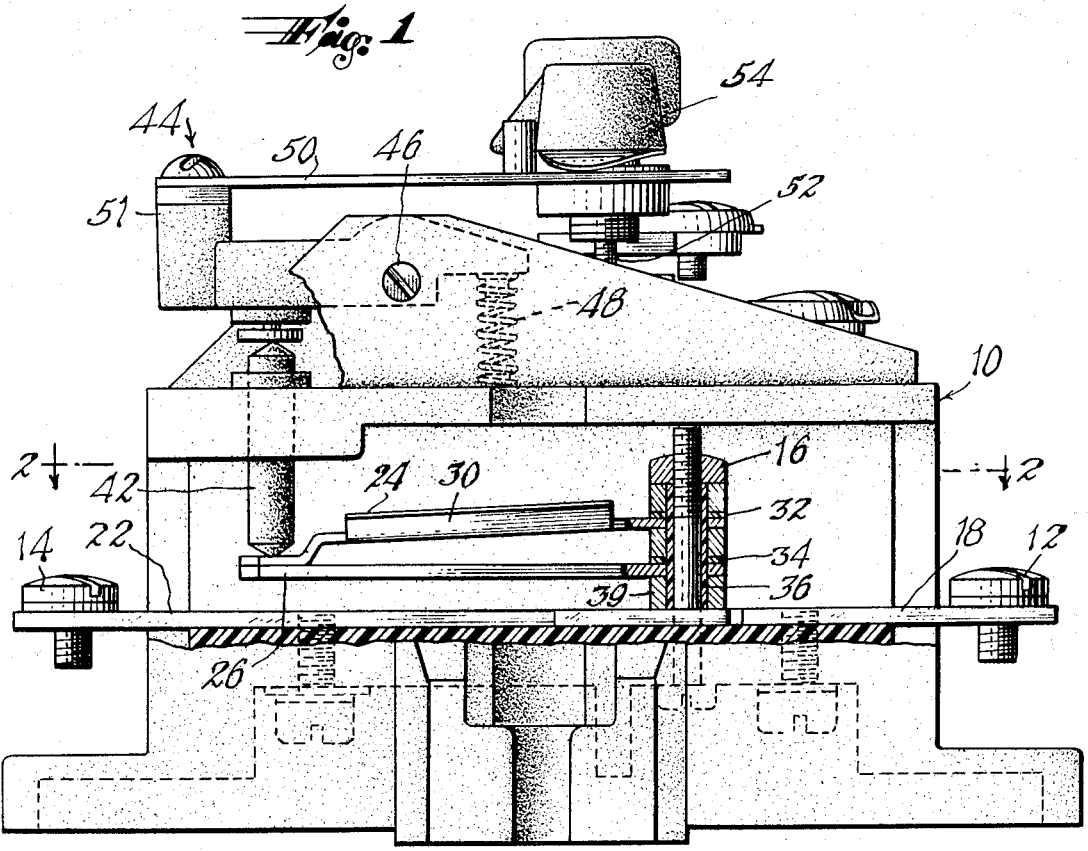
FIG. 1 is a cross-sectional, side elevation view of a first embodiment of the present invention.
Figure 2:
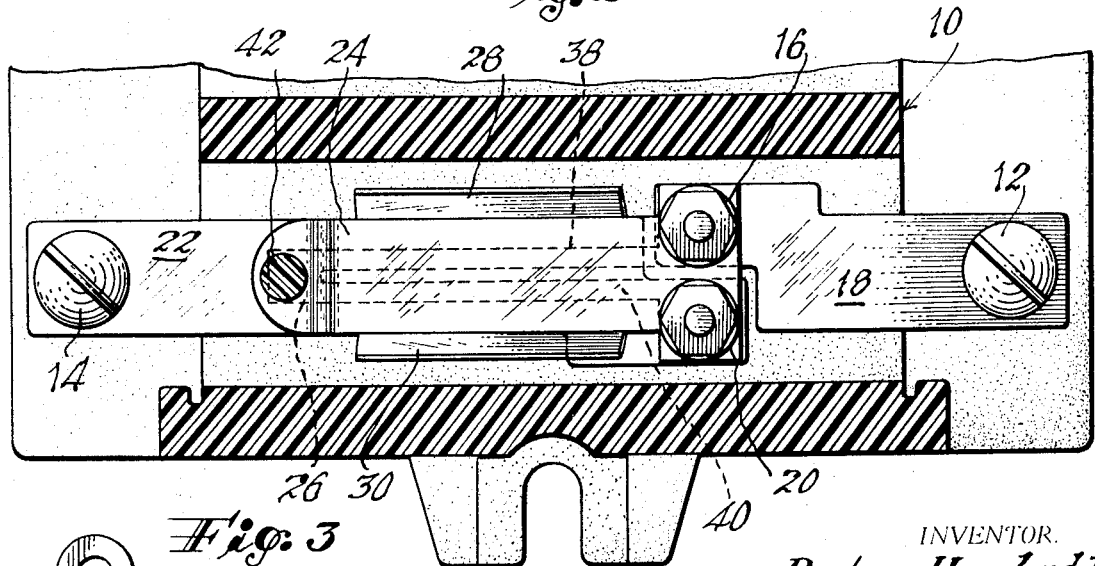
FIG. 2 is a top view, taken along line 2—2 of FIG. 1, depicting the embodiment of FIG. 1 partly in section.

The embodiment of the present invention shown in FIG. 1 comprises a body or frame of rigid insulating material which is indicated generally at 10. The switching device of FIG. 1 will be connected in series with a circuit to be monitored by means of terminals 12 and 14. As may best be seen from FIG. 2, terminal 12 is electrically connected to the center, conductive portion of a vertical post 16 by means of a heavy duty conductor 18. Similarly, terminal 14 is directly connected to the conductive portion of a vertical post 20 by means of a conductor 22.

A thermally responsive element or assembly comprised of elongated members 24 and 26 is supported at one end from posts 16 and 20, the thermally responsive element thus being cantilevered. The uppermost member 24 is a metal strip having upwardly and outwardly extending sides 28 and 30. Member 24 is supported from both of posts 16 and 20 and is electrically insulated from both posts. As may be seen from FIG. 1, member 24 is electrically insulated from post 16 by means of mica washers 32 and 34 and a tubular sleeve 36 of insulating material. At the end thereof which is disposed away from posts 16 and 20, member 24 is electrically and mechanically connected to member 26, the connecting means typically comprising a weldment.

Figure 3:
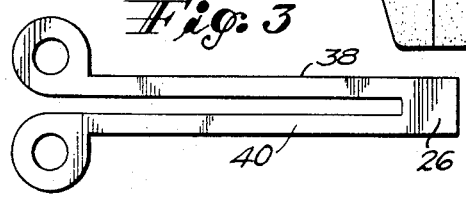
FIG. 3 is a top view of one of the members of the cantilevered, thermally responsive element of the embodiment of FIG. 1.

The lower of the two cantilevered members in the embodiment of FIG. 1, member 26, can be most clearly seen from FIG. 3. Element 26 is bifurcated to form a pair of arms 38 and 40 which have apertured flanges which permit installation of the element on vertical posts 16 and 20. Arms 38 and 40 are joined together at the end which will be remote from the supporting posts, this portion of element 26 being where the weldment to member 24 will be accomplished. Arms 38 and 40 will respectively be supported by posts 16 and 20 and arm 40 will be directly connected to the conductive center portion of post 20. Arm 38 of member 26 will be electrically connected to conductor 18 by conductive outer sleeve 39 of post 16.

As will be obvious from the foregoing, current flowing through the device from terminal 12 will pass along arm 38 of element 26 to the point where elements 26 and 24 are joined. Thereafter, path for current flow to post 20 and thence to terminal 14 will be offered by arm 40 of element 26. The size, shape, and/or materials from which elements 24 and 26 are fabricated will be chosen such that when element 26 is heated the connected ends of the two strips will swing in one direction (upwardly in FIG. 1).

A vertically movable operating rod 42 comprised of a suitable non-conductive material passes a hole provided therefor in switch body 10 and will contact, at a first end, the unsupported and connected ends of cantilevered members 24 and 26. At its opposite end, rod 42 will contact a pivotally mounted operating mechanism, indicated generally at 44, which controls a snap-action switch. Mechanism 44 pivots about bolt 46 and is spring loaded against operating rod 42 (and thus also against the cantilevered, thermally responsive element) by means of a spring 48. Movement of rod 42 is transmitted to the snap-action switch by means of a lever arm 50. The snap-action switch is itself of conventional design and thus has not been shown and will not be described herein. Suffice it to say that the snap-action switch is operated by adjustment screw 52 which engages lever 50 and the tripping force for the snap-action switch may be controlled by rotating adjustment knob 54 to thereby set the initial force applied to the snap-action switch by screw 52. A particularly unique feature of the present invention resides in the fact that it may be made self-compensating for variations in ambient temperature. This is accomplished by employing a bimetallic strip for lever arm 50, arm 50 itself being cantilevered from support means 51 of mechanism 44. Variations in the curvature of arm 50 will, of course, be transmitted by adjustment screw 52 to the snap-action switch so that the tripping force may be caused to vary inversely with ambient temperature.

Insofar as the production of mechanical deflection for switching purposes is concerned, the principal of operation of the present invention is similar to that employed in the prior art. However, the present invention is unique in that the cantilevered elements which provide the mechanical deflection under overload conditions are themselves used to monitor current.

It is especially to be noted that the above-described fast response under overload conditions is accomplished by a device which does not require external heaters or rely upon heat exchange between elements. In addition, the nature of the current carrying members of the present invention is such that they can withstand short circuit current without danger of failure. It is particularly to be noted that the response time of the present invention may be varied merely by changing the materials or configurations thereof of the two cantilevered members. Thus, the thermal switch of the present invention may be considered a universal device because of its wide utility and flexibility.

An important advantage of the apparatus embodying the invention is that "sudden" heavy overloads actually result in lower temperatures at any given point (or place) within the members than do moderate overloads because the low expansion member (in each case) has less time to expand during "heavy" or "sudden" overloads, and the switch is tripped before extreme temperatures are developed. This is a highly desirable (self-protecting) feature.

The invention also contemplates the changing of the differentials between the two members whereby different characteristic curves can be obtained; for example, changing of the materials of which the members are made, or changing the relative dimensions of the members, may vary the differentials in resistance, conductivity and thermal sensitivity.

While preferred embodiments have been shown and described, various modifications and substitutions may be made thereto without departing from the spirit and scope of the present invention. Accordingly, it is to be understood that the present invention has been described by way of illustration and not limitation.

What I claim is:

1. Apparatus for establishing a preselected electrical circuit condition in response to the flow of current in excess of normal in a monitored circuit comprising:

a thermally responsive assembly including two flexible members at least one of which is electrically conductive and capable of thermally induced expansion relative to the other member upon passage therethrough of said monitored current in excess of normal and means for supporting said assembly at their first ends and for electrically connecting at least one member in series with a circuit to be monitored, said members being rigidly mechanically connected at their second ends such that they are in spaced apart relation between their ends, said one member being a bifurcated metal strip, the legs of the bifurcated strip being joined at the end of said one member that is connected to the other member, and wherein the means for supporting said first ends of the assembly includes a first post which supports and is electrically connected to the free end of one leg of the bifurcated strip, and a second post which supports and is electrically connected to the free end of the other leg of the bifurcated strip.

2. Apparatus as defined in claim 1 with the addition of a switch controlling said monitored circuit and actuated by movement of said conductive members as a result of relative expansion thereof.

3. The apparatus of claim 2 wherein said switch is actuated by:
an operating rod, said rod contacting said second ends of said second conductive member and being comprised of nonconductive material; and
pivotable lever means extending between said rod and said switch means.

4. The apparatus of claim 3 wherein said lever means comprises:
a bimetallic strip.

5. The apparatus of claim 1 wherein said first and second posts are conductive and wherein said supporting means further comprises:

means insulating said the other member from both posts.

6. The apparatus of claim 1 wherein said means for electrically connecting said free end of said one leg to a circuit to be monitored comprises:
said first conductive; and
first terminal means electrically connected to said first post.

7. The apparatus of claim 6 wherein said means for electrically connecting said free end of said other leg to a circuit to be monitored comprises:
said second post; and
second terminal means electrically connected to said second post.

References Cited

UNITED STATES PATENTS

| | | | |
|---|---|---|---|
| 2,693,518 | 11/1954 | Bower | 337—393 XR |
| 2,647,188 | 7/1953 | Poitras | 337—139 XR |
| 2,412,483 | 12/1946 | Van C. Warrington | 337—139 |
| 2,284,383 | 5/1942 | Elmer | 337—111 XR |

OTHER REFERENCES

German printed application, DAS 1,075,708, 2-1960, H. Kummer.

BERNARD A. GILHEANY, Primary Examiner

D. M. MORGAN, Assistant Examiner

U.S. Cl. X.R.

337—393